US012156835B1

(12) United States Patent
Whitehouse

(10) Patent No.: US 12,156,835 B1
(45) Date of Patent: Dec. 3, 2024

(54) PORTABLE PRESSURIZED HYPERBARIC CHAMBER

(71) Applicant: Newtowne Hyperbarics LLC, Pokomoke, MD (US)

(72) Inventor: Andrew L. Whitehouse, Pokomoke, MD (US)

(73) Assignee: TYPHOON WATER WARES LLC, Pocomoke, MD (US)

( * ) Notice: Subject to any disclaimer, the term of this patent is extended or adjusted under 35 U.S.C. 154(b) by 0 days.

(21) Appl. No.: 18/219,463

(22) Filed: Jul. 7, 2023

(51) Int. Cl.
*A61G 10/00* (2006.01)
*A61G 10/02* (2006.01)

(52) U.S. Cl.
CPC .................................. *A61G 10/026* (2013.01)

(58) Field of Classification Search
CPC .................................................... A61G 11/009
See application file for complete search history.

(56) References Cited

U.S. PATENT DOCUMENTS 2,389,293 A * 11/1945 Blosser .................. A61G 10/04 128/205.26
3,265,059 A 8/1966 Matthews
3,848,278 A * 11/1974 Propst .................. A61G 7/0515 5/100
4,309,999 A * 1/1982 Lueder ................... A61G 10/00 607/81
5,398,678 A * 3/1995 Gamow ............... A61G 10/026 128/205.26
5,943,716 A * 8/1999 Chu ......................... A47D 9/00 5/423
6,016,803 A 1/2000 Volberg et al.
6,321,764 B1 * 11/2001 Gauger .................. A62B 31/00 135/128
6,461,290 B1 * 10/2002 Reichman ............ A61G 10/005 5/6
7,198,045 B2 4/2007 Risley et al.
8,495,835 B2 * 7/2013 Timmons .................. E06B 7/32 160/180
9,622,931 B2 4/2017 McKeeman
9,664,202 B2 5/2017 McKeeman
10,219,962 B2 * 3/2019 Nariyuki ................ A01N 25/34
10,624,813 B2 * 4/2020 Monterenzi ........... A61M 35/30
10,842,697 B1 * 11/2020 Comunale ............ A61G 10/005
(Continued)

FOREIGN PATENT DOCUMENTS

CN 111173355 A 5/2020
CN 307062107 1/2022
(Continued)

*Primary Examiner* — LaToya M Louis
(74) *Attorney, Agent, or Firm* — BLANK ROME LLP

(57) ABSTRACT

A chamber has an elongated rectangular flexible panel with a first longitudinal side and a second longitudinal side, a first lateral panel having a substantially triangular shape and rounded corners, and a second lateral panel having a triangular rectangular shape and rounded corners. The first lateral panel is sealingly engaged to the first longitudinal side of the elongated rectangular flexible panel. The second lateral panel sealingly engaged to the second longitudinal side of the elongated rectangular flexible panel. The elongated rectangular flexible panel, first lateral panel, and second lateral panel form the chamber having a substantially triangular prism shape.

10 Claims, 12 Drawing Sheets

(56) References Cited

U.S. PATENT DOCUMENTS

| | | | | |
|---|---|---|---|---|
| 11,052,007 | B2 | 7/2021 | McKeeman | |
| 11,452,654 | B2 | 9/2022 | McKeeman | |
| 11,517,490 | B2 * | 12/2022 | Jenkner | A61G 10/005 |
| 2005/0109381 | A1 * | 5/2005 | Mosteller | A61G 10/026<br>135/97 |
| 2011/0226252 | A1 * | 9/2011 | Milne | A61G 10/023<br>128/205.26 |
| 2015/0065788 | A1 * | 3/2015 | Rapoport | A61M 21/0094<br>600/22 |
| 2020/0085660 | A1 * | 3/2020 | Jenkner | A61G 1/00 |
| 2020/0178012 | A1 * | 6/2020 | Fletcher | A61F 11/08 |
| 2020/0261288 | A1 * | 8/2020 | Magbee | A61G 1/01 |
| 2020/0330307 | A1 | 10/2020 | McKeeman | |
| 2021/0128396 | A1 * | 5/2021 | Do Rêgo Filho | A61G 10/02 |
| 2021/0347064 | A1 * | 11/2021 | Shinabarger | B25J 21/02 |

FOREIGN PATENT DOCUMENTS

| | | |
|---|---|---|
| CN | 307226679 | 4/2022 |
| CN | 307821517 | 1/2023 |
| DE | 1290302 B | 3/1969 |
| WO | WO-2022/174320 | 8/2022 |

* cited by examiner

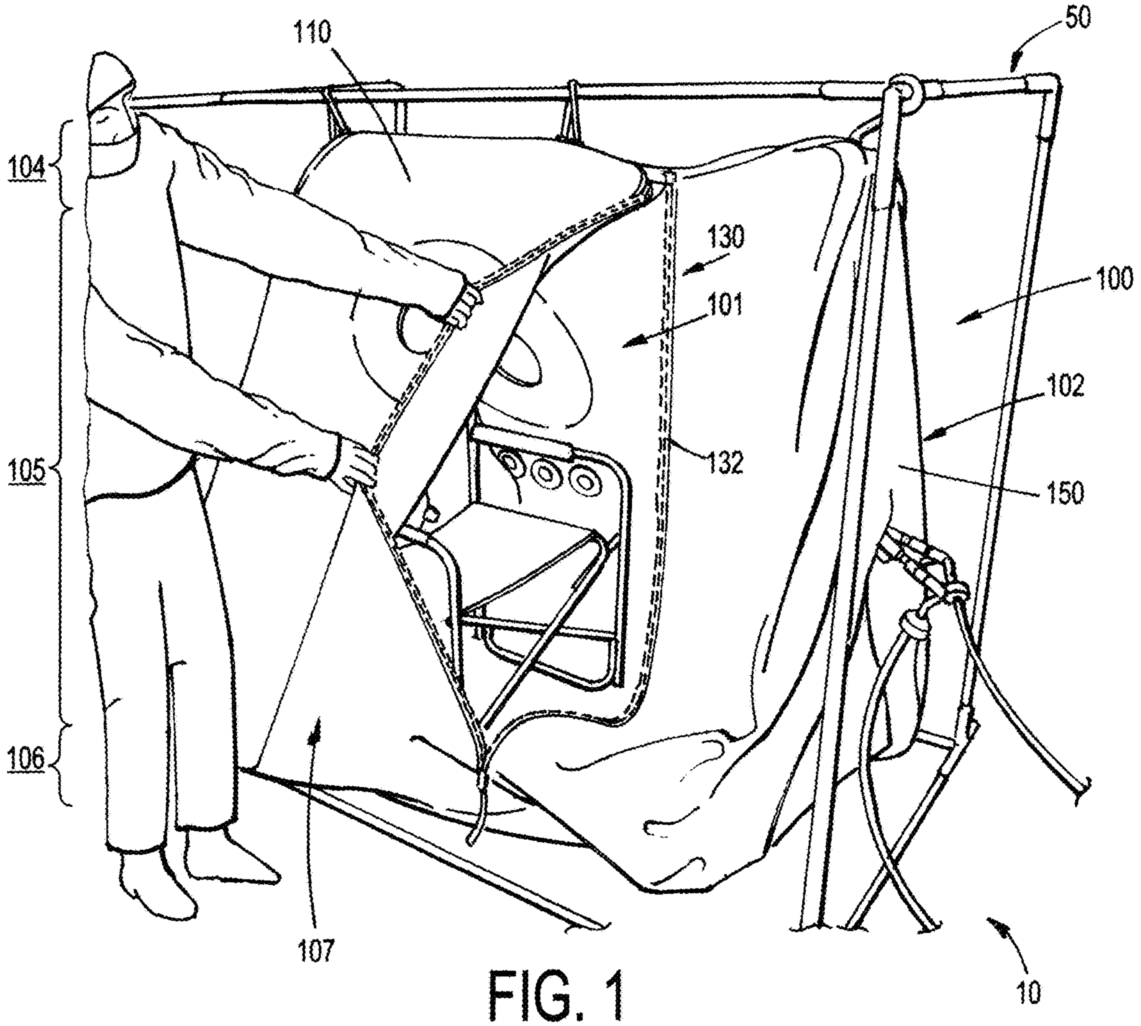
FIG. 1
FIG. 2
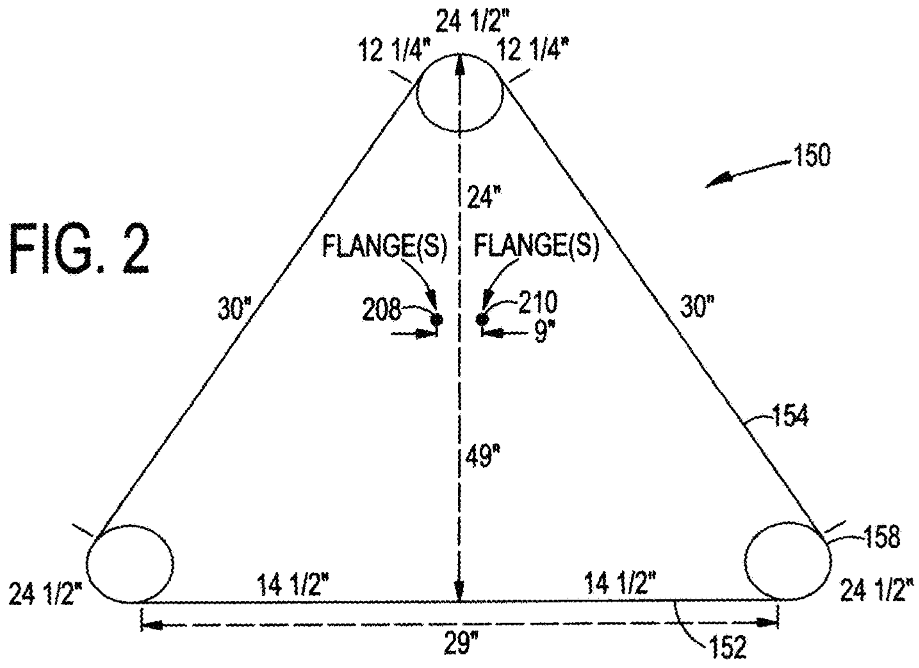

PORTABLE PRESSURIZED HYPERBARIC CHAMBER

BACKGROUND

Field

The present invention relates to hyperbaric chambers.

Background of the Related Art

Hyperbaric chambers are pressurized vessels designed to enclose a person or object. Portable hyperbaric chambers are typically made of a cloth or plastic material and have an entry that allow a user to enter the chamber. A zipper seals the entry and a clear rigid polyurethane laminated over Nylon circular member can be welded to the inside of the chamber to form a viewing port. Once the zipper is closed, the chamber can be inflated and pressurized to treat the person or object inside. One such example of a pressurized hyperbaric chamber is shown in U.S. Pat. No. 11,052,007 to McKeeman.

SUMMARY

It is one object of the present disclosure to provide a portable pressurized hyperbaric chamber that is stable. It is a further object of the disclosure to provide a portable pressurized hyperbaric chamber that has a substantially flat front face. It is a further object of the disclosure to provide a portable pressurized hyperbaric chamber that has a closure member on a substantially flat front face to reduce strain on the closure member. These and other objects of the invention, as well as many of the intended advantages thereof, will become more readily apparent when reference is made to the following description, taken in conjunction with the accompanying drawings.

BRIEF DESCRIPTION OF THE FIGURES

FIG. 1 is a perspective front view of an unpressurized chamber;

FIG. 2 is a diagram of a side panel of the chamber;

DETAILED DESCRIPTION

Figure 3:
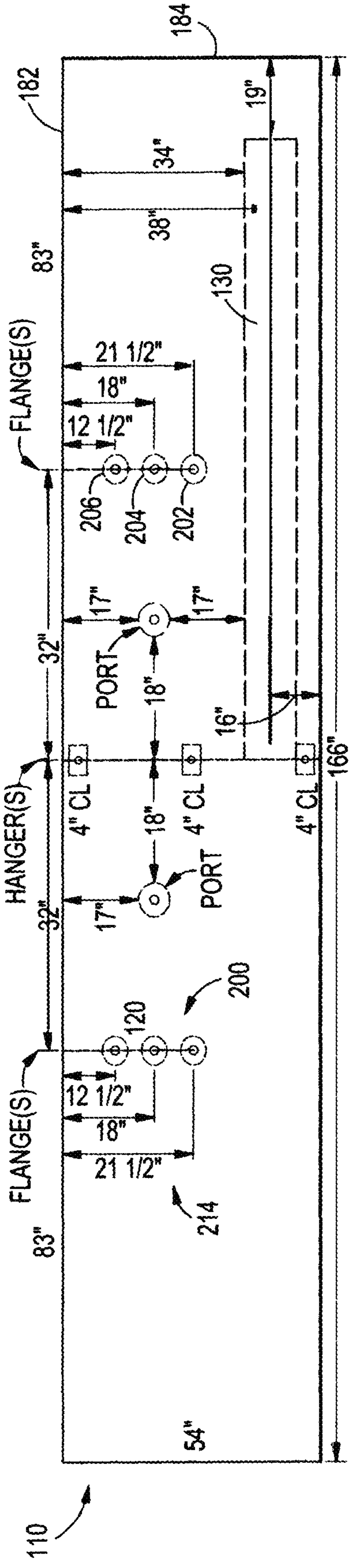
FIG. 3 is a diagram of the main panel of the chamber.

In describing the illustrative, non-limiting embodiments illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments are described for illustrative purposes, it being understood that the description and claims are not limited to the illustrated embodiments and other embodiments not specifically shown in the drawings may also be within the scope of this disclosure.

Turning to the drawings, FIG. 1 shows a portable pressurized hyperbaric chamber system in accordance with one example embodiment of the disclosure. The system 10 includes a portable pressurized hyperbaric chamber 100, a frame 50, and pressurizing equipment 70. The chamber 100 has an unpressurized operating state (FIG. 1, also referred to here as a deflated state) and a pressurized operating state (FIGS. 4-7, also referred to here as an inflated state). The frame 50 supports the chamber in both the unpressurized and pressurized operating states. And the pressurizing equipment 70 pressurize the chamber 100 to move from the unpressurized operating state to the pressurized operating state.

Hyperbaric Chamber 100

Referring to FIGS. 1, 4-7, 14(*a*)-(*f*), 15(*a*)-(*f*), the hyperbaric chamber 100 has a body 102 that includes a medial main section 110 and two lateral sections 150, and one or more pressure control mechanisms 200. The body 102 has a top portion 104, intermediate portion 105 and bottom portion 106.

Figure 15:
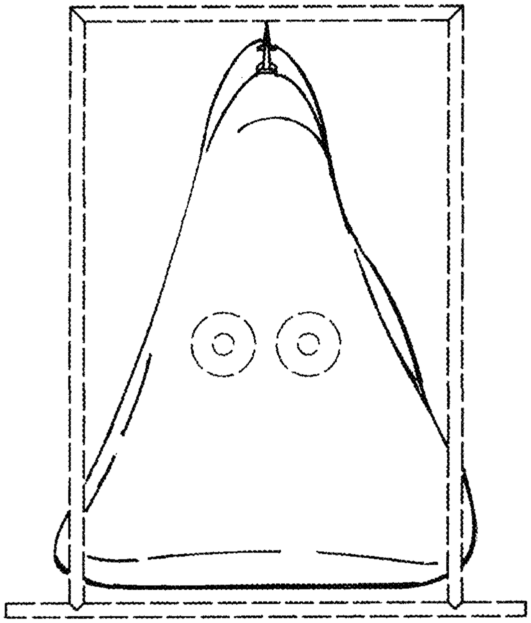
FIGS. 15(*a*)-(*f*) show right side, left side, top, bottom, front and rear views of the chamber in an inflated mode, respectively.
Figure 15:
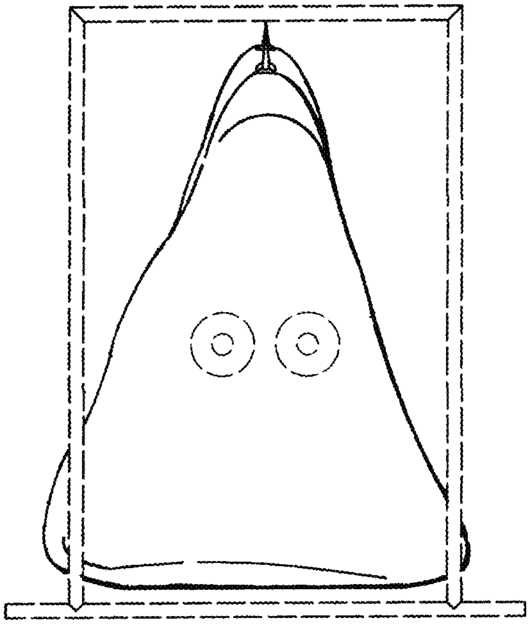
Figure 15:
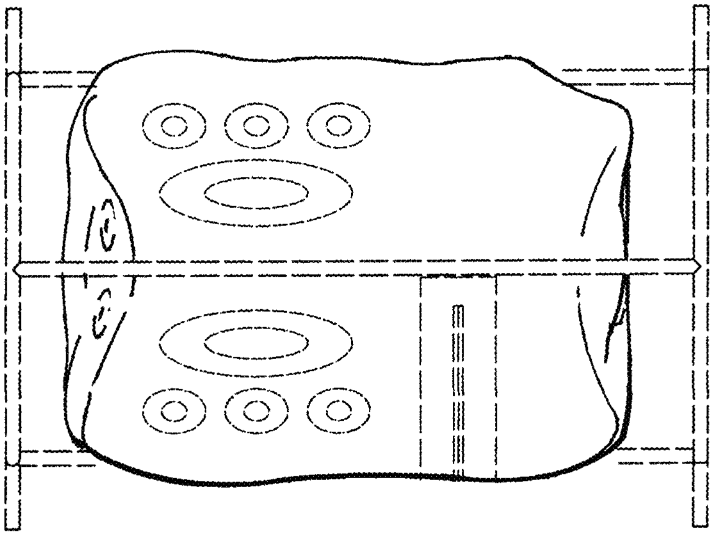
Figure 15:
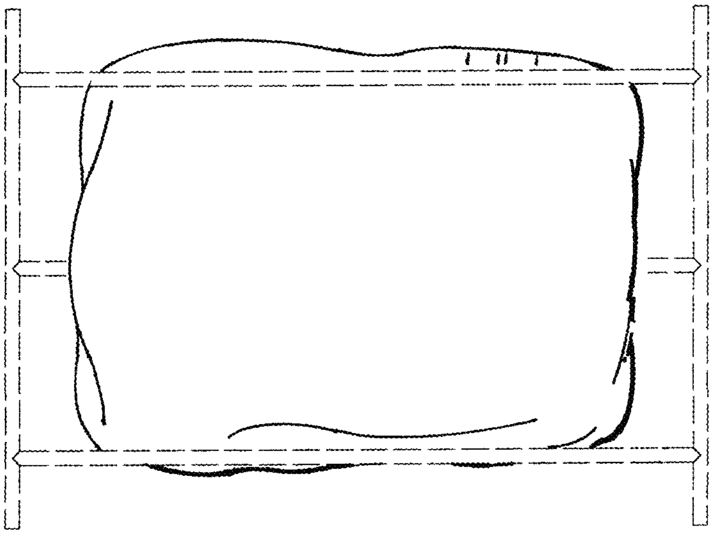
Figure 15E:
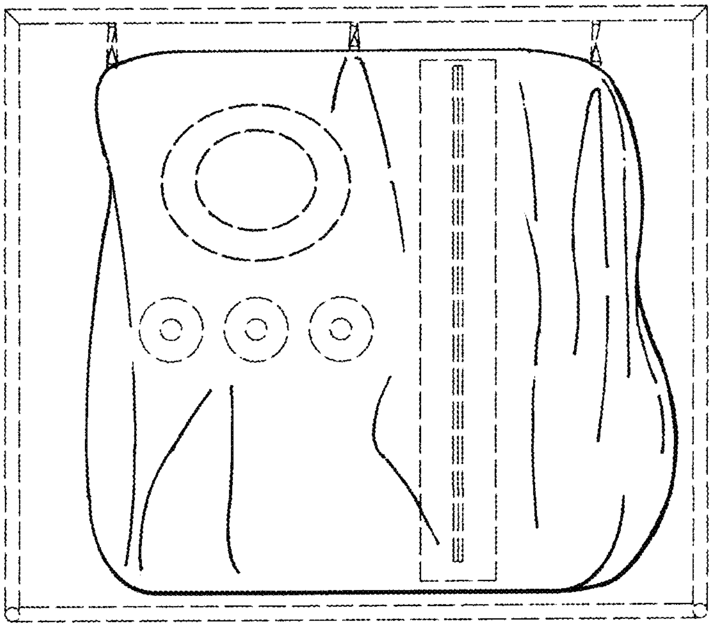
Figure 15F:
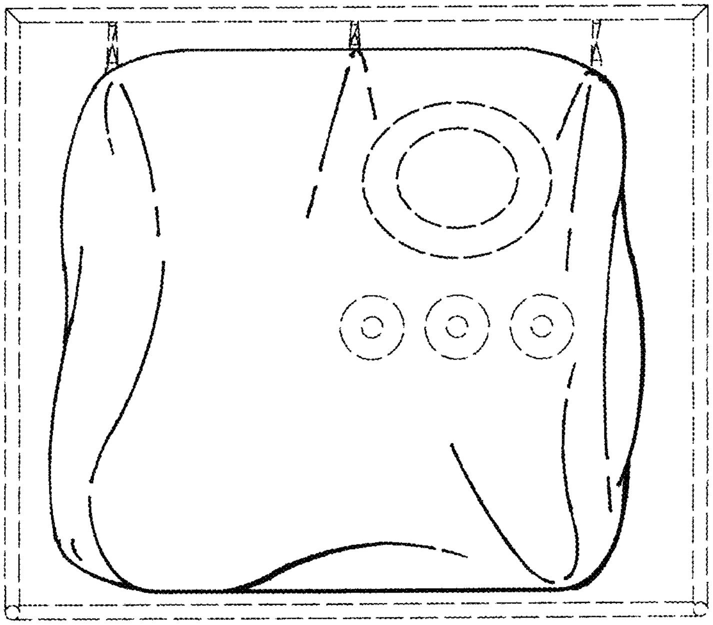

In the embodiment shown, the medial main section 110 is a flexible single-piece unitary material, such as a sheet or panel, that forms a wall of the chamber 100. As best shown in FIG. 3, the main section 110 has an elongated rectangular shape with longitudinal sides 182 and transverse sides 184 that extend orthogonal to the longitudinal sides. The two lateral sections 150, as best shown in FIG. 2, is a flexible single-piece material, such as a sheet or panel, that forms a wall of the chamber 100. Each of the later sections 150 have a substantially equilateral triangular shape (in the inflated and uninflated configurations, FIGS. 14, 15) having a base side 152, two upright sides 154, and three corners 158. In the embodiment shown, all of the three corners 158 are rounded or curved. The material can be polyurethane laminated Nylon, which is very flexible and there are no rigid components, so the chamber can be readily folded for transport.

The chamber 100 is assembled by sealing each of the longitudinal sides 182 of the main section 110 to the enter outer perimeter portion of each of the respective lateral sections 150. In particular, each of the longitudinal sides 182 of the main section 110 is sealed to the sides 154 and corners 158 of a respective one of the lateral sections 150. In addition, the two transverse sides 184 of the main section 110 are sealed together, either before or after the main section 110 is sealed to the lateral sections 150. The seals are airtight and can withstand high pressures needed for the chamber 100.

The assembled chamber 100 is shown in FIG. 1, in the unpressurized state. The main section 110 takes on the triangular shape of the lateral sections 150, so that the entire chamber 100 has a triangular prism shape with a triangular cross-section having rounded corners. The medial main section 110 forms forward facing front face 107 having a square or rectangular shape, a rearward facing rear face 108 having a square or rectangular shape, and a bottom or floor of the triangular prism having a square or rectangular shape. The lateral sections 150 each form two triangular shaped sides. FIGS. 4-7 show the chamber 100 in the pressurized state, with the front and rear faces 107, 108 expand to curve slightly outward, so that the triangular prism is slightly curved but still maintains the triangular shape. The front and rear faces 107, 108 are substantially flat and substantially flatter than, for example, a cylindrical shape. The rounded corners 158 and the front and rear faces 107, 208 are configured to accommodate the expansion. The expansion is relative to the pressure, though typically at normal operating pressures and temperature, expansion can be 10-15%, with a radius of curvature for the corners of about 12.07 degrees at the top and 10.87 degrees on the bottom sides. The rounded corners spread out the stress.

According to the present disclosure, the front and rear faces 107, 108 are flat or planar, or substantially flat or planar. Those faces can be considered to be substantially flat or planar even when the chamber is pressurized and the faces expand outward, when an angle between a linear path between corners of the chamber and the actual wall of the chamber, is up to about 15 degrees.

Further according to the present disclosure, the chamber 100 is considered to be triangular or substantially triangular (both when inflated and uninflated) when it has a cross-section with three corners (angled, rounded or curved), and is an equilateral triangle when a linear path between those corners are substantially about 60 degrees; though it is recognized that the actual angles at those corners can range from about 45-75 degrees when pressurized and the walls are curved and not linear due to the pressurization. Alternatively, the chamber 100 can be considered to be triangular when it is more similar to a triangle than to a regular polygon, and especially a circle or square. In one example, similarity can be established using a best-fit equilateral triangle, where best-fit is determined by having equivalent excess area and missing area. The quality of the fit is determined by the excess area to the best-fit equilateral triangle which is therefore equivalent to the missing area to the best-fit equilateral triangle. Thus, a chamber 100 that is non-triangular will show a greater resemblance to a best-fit circle, best-fit square, or other best-fit regular polygon. It will be recognized, however, that other suitable triangular shapes can be utilized, and that the triangular shape need not be equilateral, and can have interior angles of 45-75 degrees.

Thus, the entire assembly includes three unitary discrete material pieces (the main section 110 and the two lateral sections 150), and three seals—namely the first and second seals of the main section 110 to the two lateral sections 150, and the third seal of the two transverse sides 184 of the main section 110. In one embodiment, the third seal of the two transverse sides 184 is aligned with the base side 152 of the lateral sections 150, and particularly in the middle of the base sides 152, and not at the corners 158. Accordingly, the third seal extends along a floor of the medial section 110. And the medial main section 110 is positioned between the two lateral sections 150.

As further shown in FIG. 1, the chamber 100 forms a complete enclosure having an interior space 101. The chamber 100 has a triangular. Various objects, such as chair, table, medical devices, can be positioned inside the interior space 101 of the chamber.

Referring to FIGS. 1, 3-5, the medial section includes an access opening 130 that permits entry into and exit from the interior space 101 of the chamber. As shown, the access opening 130 is formed by a slit 132 and extends substantially the entire height of the chamber 100 from the top portion 104 to the bottom portion 106 of the chamber 100. The opening 130 has an opening/closure mechanism (also referred to as a closure member) that opens and closes the opening 130.

Figure 10:
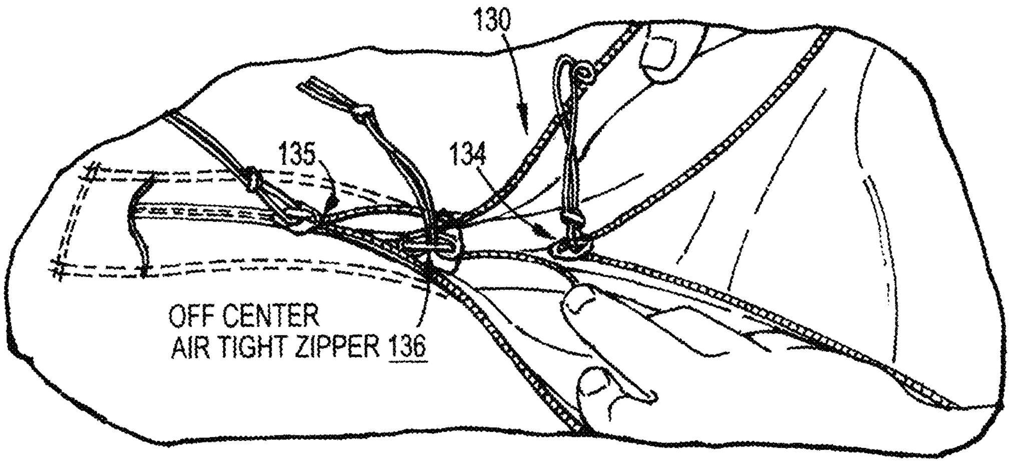
FIG. 10 shows zippers to open and close a door opening.

As shown in FIG. 10, the opening/closure mechanism can include a fastener such as one or more sliding zippers, for example one or more coil safety zippers 134, 135 and/or an off-center airtight main zipper 136. The airtight zipper 136 is sandwiched off-center between two coil safety zippers 134, 135 for maximum strength. The airtight zipper has very limited separation strength, so it is reinforced to isolate it from stress when pressurized. Two large coil fasteners 134, 135 are provided, one on either side of the airtight zipper 136 for stress isolation. That is, a first coil fastener 134 is provide at the inside of the chamber to open/close a first inner door layer, and a second coil fastener 135 is provided at the outside of the chamber to open/close a second outer door layer. The airtight zipper 136 opens/closes a main door layer, which is located between the first and second layers. To close the opening, the user can close the fasteners in sequence, such as the first coil fastener 134, then the main fastener 136, then the second coil fastener 135; or, the second coil fastener 135, then the main fastener 136, then the first coil fastener 134. The coil fasteners 134, 135 reduce the pressure/stress on the main airtight zipper 136 to make it easier to open and close the airtight zipper 136 and so the coil fasteners 134, 135 support and reinforce the airtight zipper. The fasteners 134, 136 can be operated from inside and/or outside the chamber 100.

The opening/closure mechanism is shown extending to the extreme top of the chamber, and the chamber 100 can be sized so that it can be used for a seated person and can be shorter than a standing person so that the opening/closure mechanism can be reached and easier to operate to the extreme top of the chamber. In other embodiments, however, the opening/closure mechanism need not extend to the extreme top of the chamber 100.

The access opening 130 is linear and is formed substantially vertically in the front face 107 of the medial main section 110. As shown, the opening 130 extends to the floor of the chamber 100 so that the user need not step too high to enter and exit the interior space 101, without tripping. In addition, the opening 130 is vertical, so that it is easy to open and close the zipper. In addition, because the chamber 100 has a triangular prism shape, the front face 107 is flatter (even when the faces 107, 108 expand outward due to pressurization) than a cylindrical shaped chamber, which makes it easier to open and close the opening. The flatter front face 107 also allows for a shorter length of the opening 130 and less strain on the opening/closure mechanism when operating. The triangular shape also allows for easier entry because there is less obstruction to the user and the opening is closer and easier to access, for example because the opening 130 is the outermost part of the front face 107. The triangular shape is smaller and more compact, and requires a smaller footprint than other shapes, and avoids unused space, and has increased stability because the floor of the chamber is in greater contact with the building floor. When pressurized, the chamber bulges or bows outward at the floor and sides. The frame 50 is fastened to the chamber 100 to stabilize the chamber.

In one embodiment, the chamber 100 can be operated at a maximum operating pressure up to about 1.3 ATA, as provided by the FDA.

Viewing Ports 120

Referring to FIGS. 1, 4-6, one or more viewing ports 120 can be formed in the chamber 100. In the embodiment shown, a viewing ports 120 is formed in the front face 107 and in the rear face 108 of the main section 110.

Figure 11:
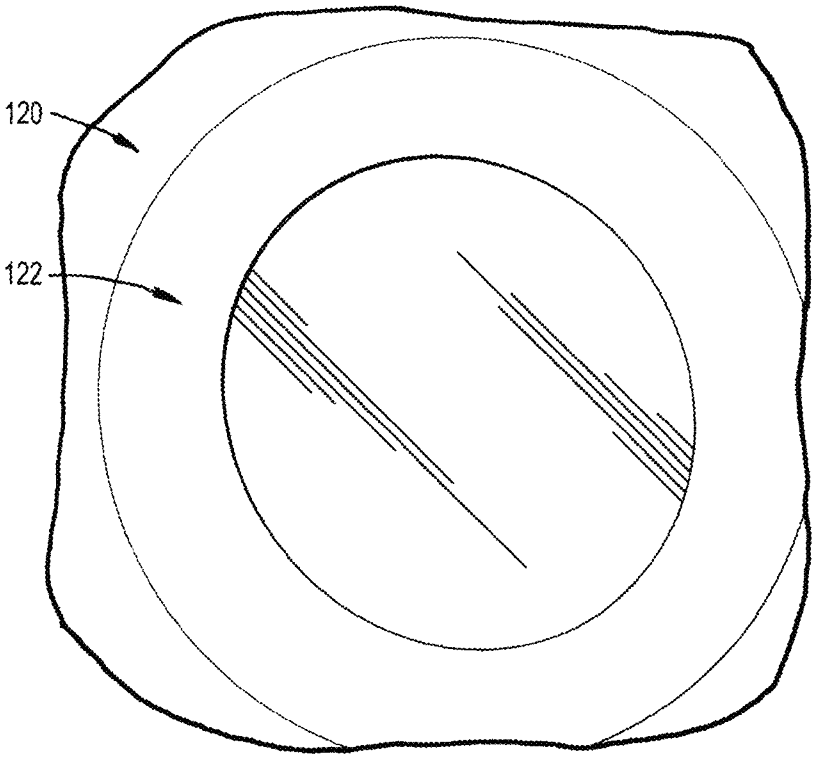
FIGS. 11-13 show formation of a port opening in the chamber.
Figure 12:
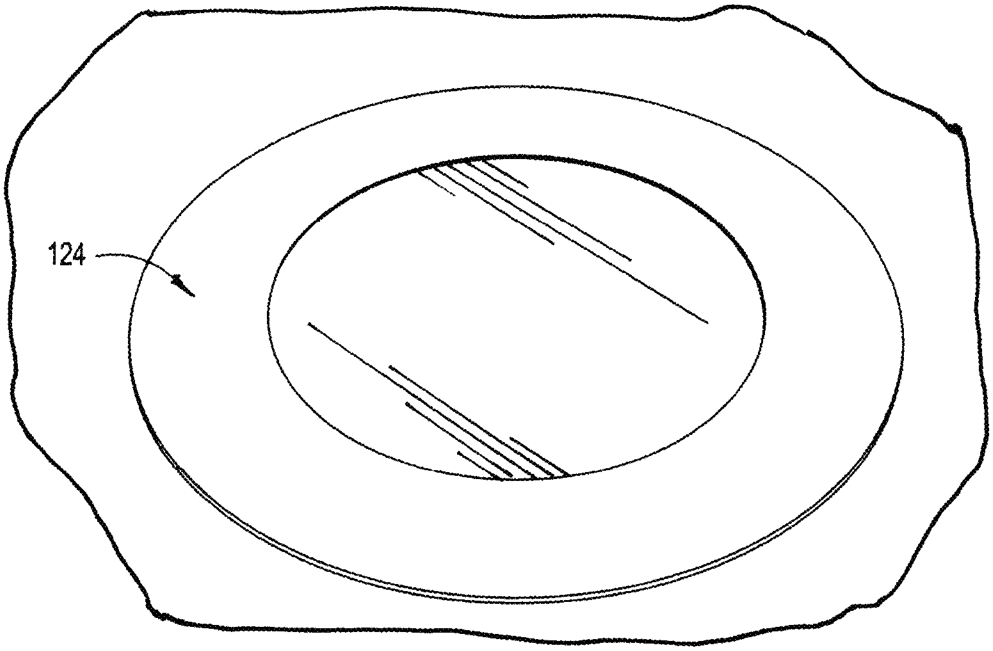
Figure 13:
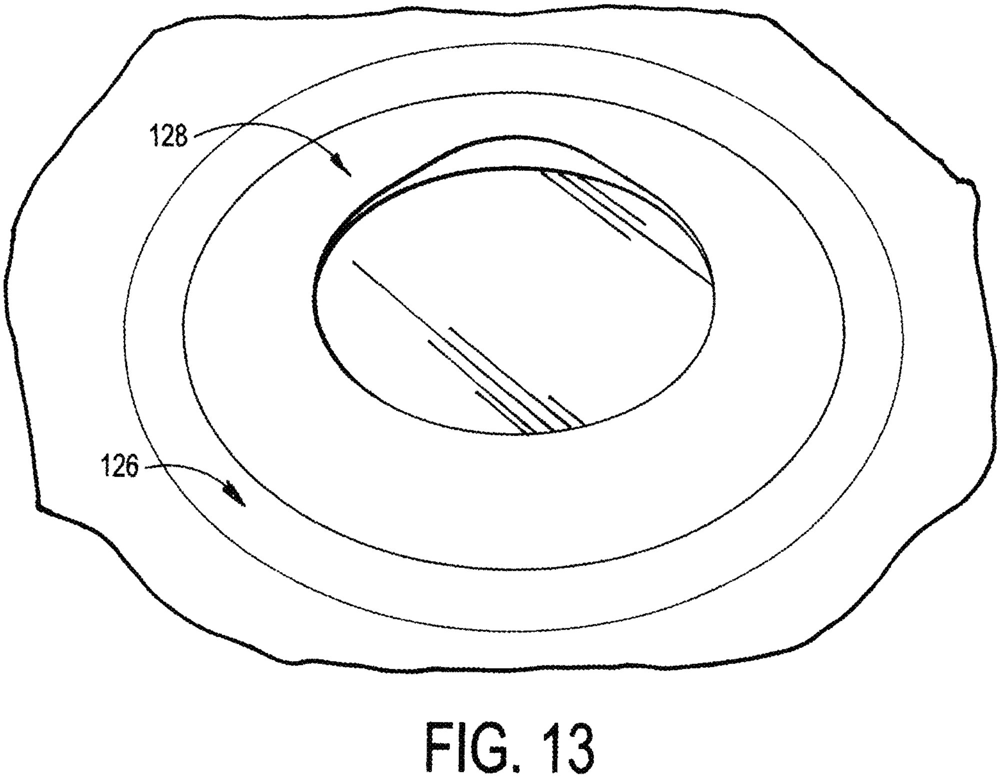
Figure 14A:
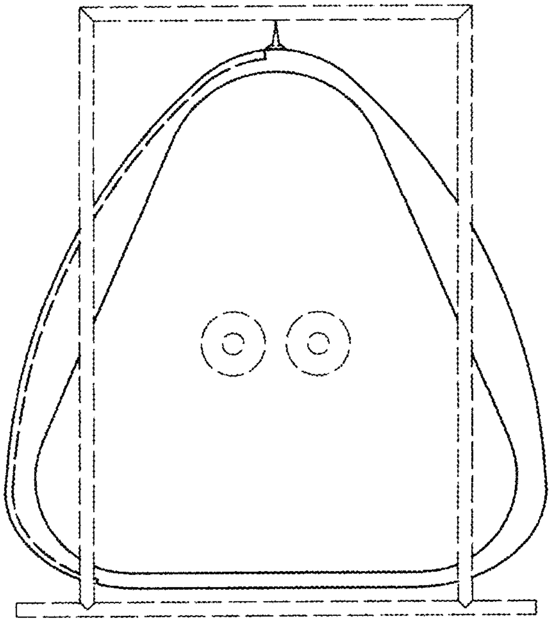
FIGS. 14(*a*)-(*f*) show right side, left side, top, bottom, front and rear views of the chamber in an inflated mode, respectively.
Figure 14B:
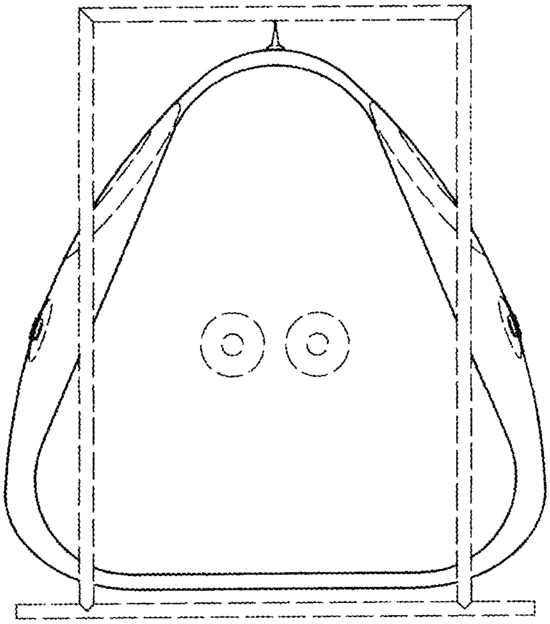
Figure 14C:
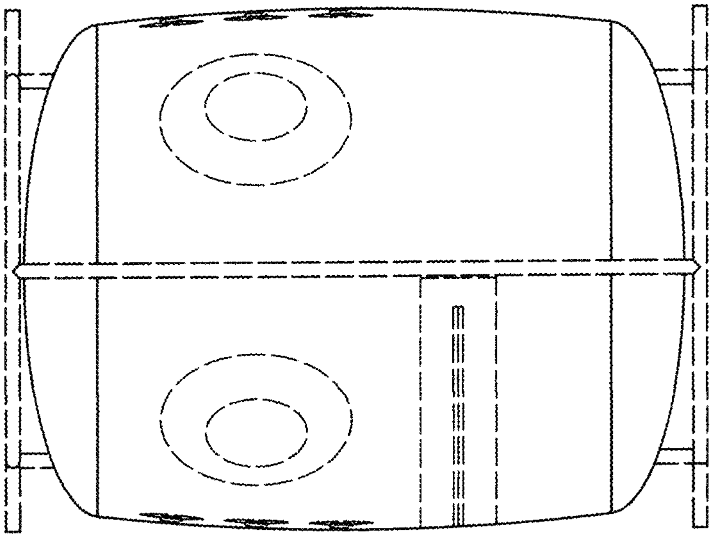
Figure 14D:
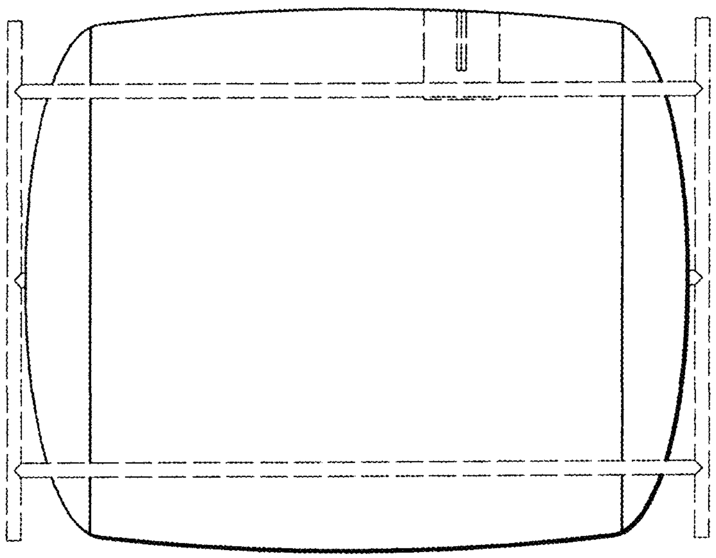
Figure 14E:
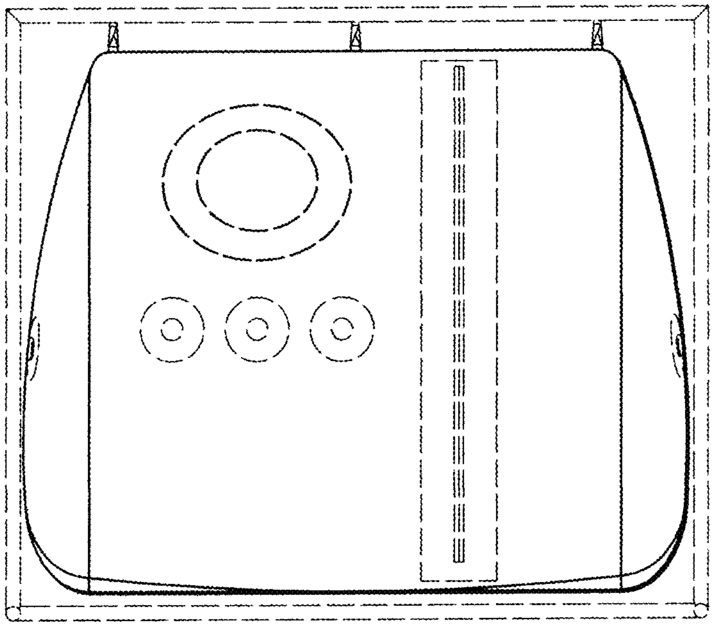
Figure 14F:
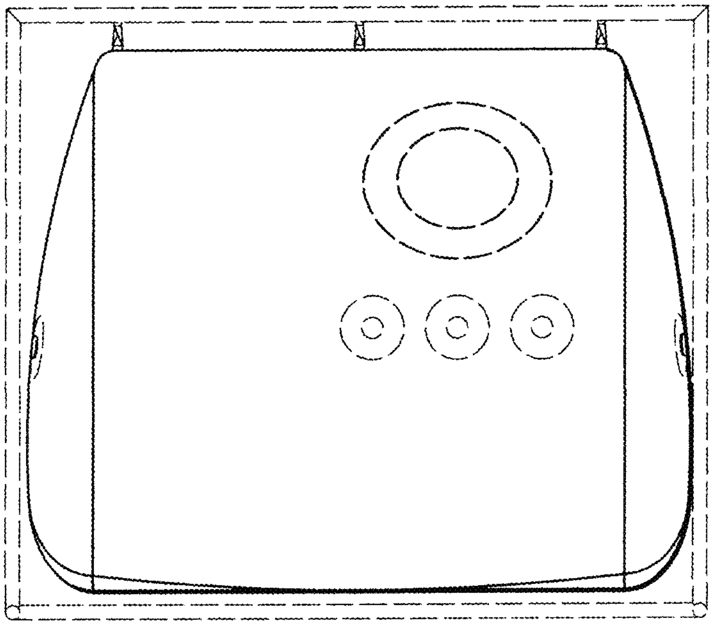

The viewing ports 120 are shown in greater detail in FIGS. 11-13. Starting with FIG. 11, a first layer is formed as a thin transparent circular rigid layer 122, such as made of a polyurethane. The first layer is affixed (such as by being welded) to the inside surface of the chamber 100 about the viewing port opening. The rigid layer 122 is flexible, and able to bend with the curvature of the front and rear faces 107, 108 as the chamber is pressurized. An opaque cover can be provided at the inside and/or outside of the chamber that the user can open and close to provide privacy. The rigid layer 122 is substantially larger than the opening so that a reliable connection is made. In one embodiment, the opening of the port can be approximately 9 inches. During manufacturing, alignment marks can be utilized for placement.

However, the rigid layer 122 alone tends to bulge out when the chamber is pressurized, and can even burst. Accordingly, the viewing port 120 is reinforced. Turning to FIG. 12, a second layer 124 is formed as a thin transparent circular rigid layer 124, such as made of a polycarbonate. The second layer 124 is affixed (such as by being welded) to the outside surface of the chamber 100 about the viewing port opening. The second layer 124 is flexible, and able to bend with the curvature of the front and rear faces 107, 108 as the chamber is pressurized. The rigid layer 122 is substantially larger than the opening so that a reliable connection is made. In one embodiment, the disk 124 is approximately 0.125 inches thick polycarbonate with a diameter of about 13 inches. The rigid layer 122 is about 0.055 inches thick clear, unreinforced polyurethane. The second layer 124 has a diameter of about 14 inches.

Now referring to FIG. 13, a third layer 128 is formed as a thin ring of laminated material 128. The third layer 128 is affixed (such as by being welded) by a weldment 126 to the second layer 124, so that the second and third layers 124, 126 form a double laminate. The flat circumferential area of the weldment 126 is approximately one inch, and the third layer 128 is the area inside the weldment. The weldment 126 is welded over the polycarbonate disk 124 to secure it on the chamber with two plies laminated/welded with a 17-inch outer diameter and a 9-inch inner diameter. The port is 19 inches outer diameter with a double laminated ring. The weldment 126 is approximately one-inch wide ring with a center opening that extends around the polycarbonate disk 124 and the inside 128 of the weldment 126 covers and restrains the disk 124.

Pressure Control Mechanisms 200

One or more pressure control mechanisms 200 are formed about the chamber 100. Any suitable control mechanisms can be utilized. In the embodiment shown for example in FIG. 1, one or more external deflate valves 202, pressure gauges 204, and/or interior deflate valves 206 are positioned in the wall of the front face 107 of the main section 110, such as through an opening in the main section 110 that is sealed to form a port. In addition, spare flanges 214 (FIG. 6) can be positioned in the wall of the rear face 108 of the chamber. And, a flange 208 and spare flange 210 can be positioned in the wall of one of the lateral sections 150, which connects via a connector and hoses to an air compressor. In addition, pressure relief valves (FIG. 6) can be positioned in the wall of another lateral section 150.

Frame 50

Figure 4:
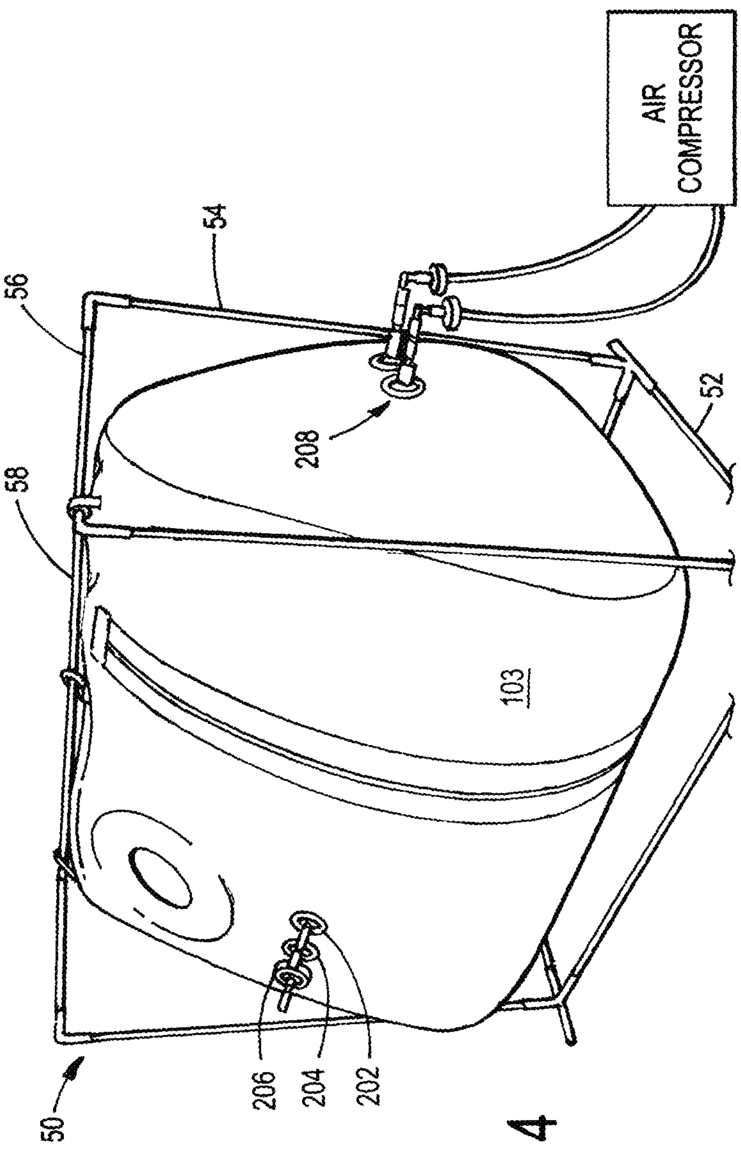
FIG. 4 is a perspective view of the pressurized chamber.
Figure 5:
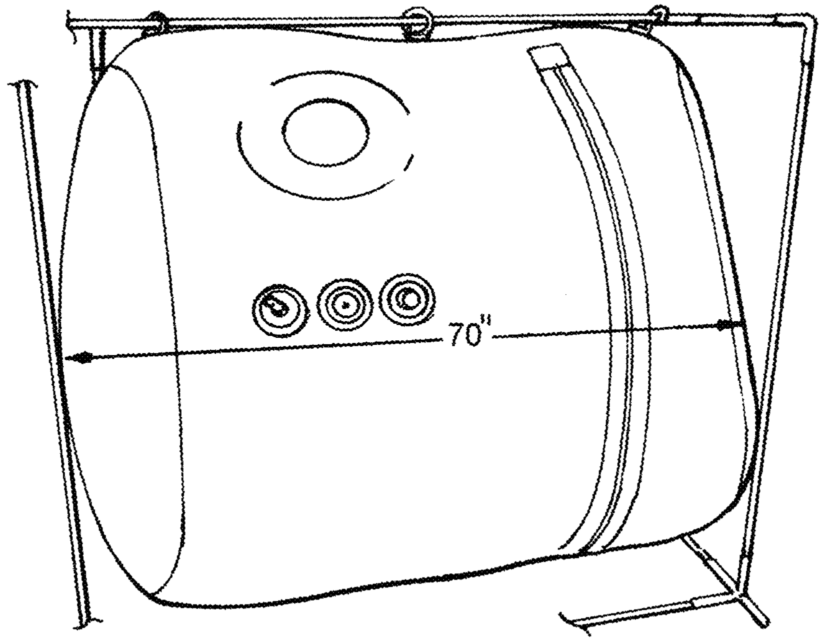
FIG. 5 is a front view of the pressurized chamber.
Figure 6:
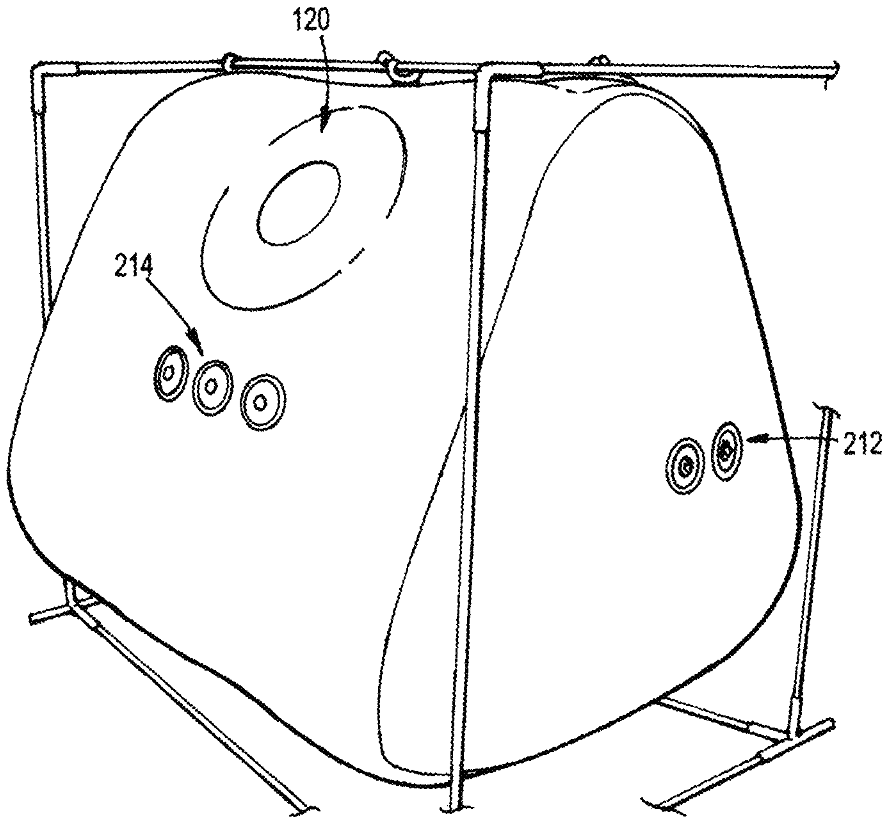
FIG. 6 is an angled view of the pressurized chamber.
Figure 7:
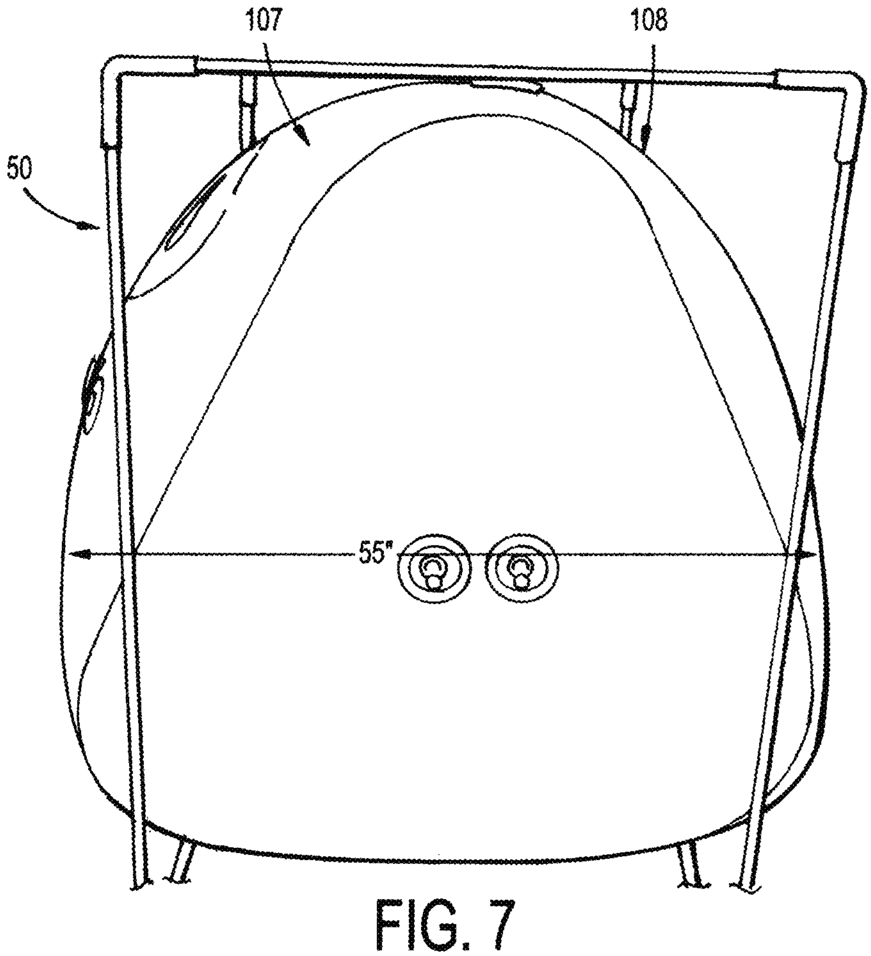
FIG. 7 is a side view of the pressurized chamber.

The frame 50 is best shown in FIGS. 4, 7. The frame 50 includes one or more support poles that extend substantially vertically and horizontally to form a cube-like shape that extends about the exterior of the chamber 100. In particular, the frame 50 has one or more linear or curved floor support posts 52 that extend substantially horizontally. In the embodiment shown, four linear floor support posts 52 are provided that connect together to form a square or rectangle on the floor. One or more linear or curved vertical support posts 54 are provided that extend substantially upward from the floor support posts 52. In the embodiment shown, for example, a linear vertical support post 54 extends substantially orthogonally and vertically upward and connects to the floor support posts 52, such as at each of the four corners formed by the floor support posts 52. In addition, one or more linear or curved raised substantially horizontal support posts 56 are provided that connect to the vertical support posts 54. For example, in the embodiment shown, a raised horizontal support post 56 is connected to the top of the vertical support posts 54 at the lateral sides of the frame 50 to form a rectangular or square side frame portion at each of the lateral sides of the chamber 100.

Finally, one or more raised cross-support posts 58 are provided. In the embodiment shown, a single raised cross-support post 58 connects to each of the two lateral side raised support posts 56. In one embodiment, the cross-support post 58 connects to the middle of the lateral side raised support posts 56, so that the cross-support post 58 does not otherwise obstruct the entry opening 130, but also supports the deflated chamber in an upright position to facilitate entry and exit of the user into and out of the interior space of the chamber 100. The cross-support post 58 extends substantially horizontally and parallel to a center longitudinal axis of the chamber 100 and of the frame 50.

Figure 8:
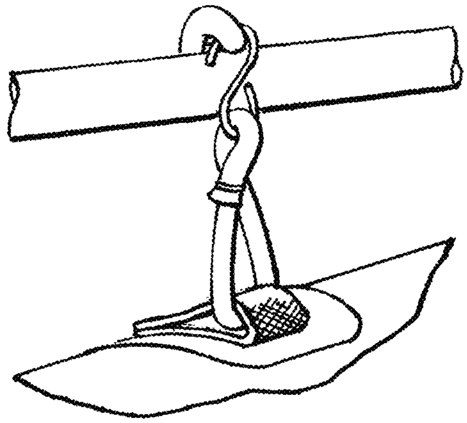
FIG. 8 shows the chamber attached to a frame.
Figure 9:
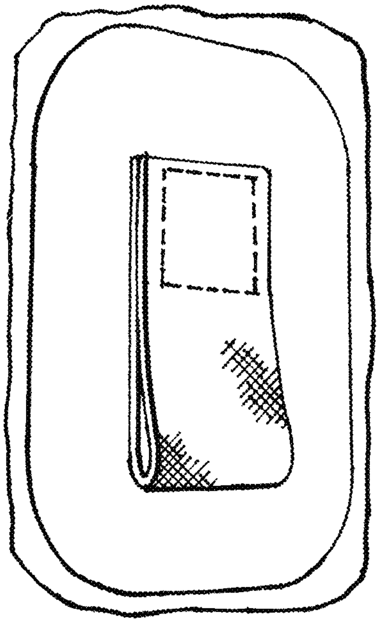
FIG. 9 shows Velcro straps that can be used to attach the chamber to the frame.

One or more fastening mechanisms, such as loops (FIG. 8) and/or Velcro straps (FIG. 9) can be affixed to or connected with the chamber 100 to attach the chamber 100 to the frame 50. In particular, the fastening mechanisms can attach the top portion 104 of the chamber 100 to the one or more raised frame lateral support poles 56 and/or cross-support poles 58. Fastening mechanisms can also be attached to the bottom portion of the chamber 100 and the floor support members 52. The frame 50 and fastening mechanisms are particularly useful when the chamber 100 is deflated, to facilitate entry and exit of the user into and out of the chamber 100. For example, the top fastening mechanisms keep the deflated chamber 100 raised, and the bottom fastening mechanism keep the floor of the chamber 100 spread out. The frame 50 and fastening mechanisms further prevent movement of the chamber 100 when inflated and deflated.

Operation

In operation, the chamber 100 is in the unpressurized or deflated state, prior to use. The fasteners at the top hang the chamber to the frame, so that the frame 50 and fasteners retain the chamber 100 in the unpressurized state so that the chamber 100 is held upright. The fasteners at the bottom keep the bottom floor spread out. Once the user has entered the chamber, the opening is sealed closed, and the pressurizing equipment 70 is turned on to pressurize the chamber 100. When pressurized, the chamber 100 can expand outward, beyond the frame 50.

The chamber system 5 is considered to be portable because it can be readily disassembled and transported. For example, the chamber 100 is formed of flexible walls, so it can be folded or rolled for transport. And, the chamber 100 can be detached from the frame, hoses and air compressor, and the frame 50 can be disassembled for transport. The opening access 130 is located at the elongated front face 107 so that it is easier to access. The opening access 130 is only vertical and linear, and a straight zipper is easier to operate. The design also requires fewer seams.

Dimensions

One embodiment of the disclosure is for the chamber 100 to be sized and configured to fit a single seated person. In that embodiment, the chamber at 4 psi is 57 inches in height, 70 inches in length, and 55 inches in width. The lateral sections 150 are about 30-35 inches per side and the corners have a radius of curvature of about 24.5 inches. The closure member is about 64.5 inches in length. The main section 110 is about 166 inches in length and about 54 inches in width. The chamber 100 can be lengthened to fit multiple persons. And the chamber 100 can have side angles of about 61 degrees and top angles of about 53 degrees. Of course, other suitable sizes and dimensions can be utilized within the spirit and scope of this disclosure.

Within this specification, the various sizes, shapes and dimensions are approximate and exemplary to illustrate the scope of the invention and are not limiting. The sizes and the terms "substantially" and "about" mean plus or minus 15-20%, or in other embodiments plus or minus 10%, and in other embodiments plus or minus 5%, and plus or minus 1-2%. In addition, while specific dimensions, sizes and shapes may be provided in certain embodiments of the invention, those are simply to illustrate the scope of the invention and are not limiting. Thus, other dimensions, sizes and/or shapes can be utilized without departing from the spirit and scope of the invention.

It is further noted that the drawings may illustrate and the description and claims may use several geometric or relational terms and directional or positioning terms, such as planar, linear, curved, elongated, circular, rounded, parallel, perpendicular, orthogonal, transverse, concentric, triangular prism, prism, circular, flat, vertical, horizontal, top, bottom, inner, outer, side, square, and rectangular. Those terms are merely for convenience to facilitate the description based on the embodiments shown in the figures, and are not intended to limit the disclosure. Thus, it should be recognized that the invention can be described in other ways without those geometric, relational, directional or positioning terms. In addition, the geometric or relational terms may not be exact. For instance, walls or surfaces may not be exactly flat, perpendicular or parallel to one another but still be considered to be substantially perpendicular or parallel because of, for example, roughness of surfaces, tolerances allowed in manufacturing, expansion due to pressurization, etc. And, other suitable geometries and relationships can be provided without departing from the spirit and scope of the invention.

The foregoing description and drawings should be considered as illustrative only of the principles of the disclosure, which may be configured in a variety of shapes and sizes and is not intended to be limited by the embodiment herein described. Numerous applications of the disclosure will readily occur to those skilled in the art. Therefore, it is not desired to limit the disclosure to the specific examples disclosed or the exact construction and operation shown and described. Rather, all suitable modifications and equivalents may be resorted to, falling within the scope of the disclosure.

The invention claimed is:

1. An inflatable hyperbaric pressurized chamber, comprising:

an elongated rectangular flexible panel made of flexible cloth material having a first longitudinal side, a second longitudinal side, said first longitudinal side having a first longitudinal perimeter end, said second longitudinal side having a second longitudinal perimeter end, and said elongated rectangular flexible panel further having an intermediate portion between said first longitudinal side and said second longitudinal side;

a linear closure member located on the intermediate portion of said elongated rectangular flexible panel and extending linearly and substantially vertically thereon, said linear closure member comprising a zipper;

a first flexible cloth lateral panel having a substantially triangular shape and rounded corners, said first lateral panel sealingly engaged to said first longitudinal side of said elongated rectangular flexible panel at said first longitudinal perimeter end; and a second flexible cloth lateral panel having a triangular shape and rounded corners, said second lateral panel sealingly engaged to said second longitudinal side of said elongated rectangular flexible panel at said second longitudinal perimeter end;

wherein said elongated rectangular flexible panel, said first lateral panel, and said second lateral panel form the inflatable chamber having a substantially triangular prism shape with a first flattened bottom side, a second flattened downwardly-angled side, and a third flattened downwardly angled side, wherein said linear closure member is positioned on the second or third flattened downwardly-angled sides.

2. The chamber of claim 1, said closure member extending from a top of said chamber to a bottom of said chamber.

3. The chamber of claim 1, said closure member extending from a bottom of said chamber to an intermediate portion of said chamber.

4. The chamber of claim 1, further comprising a viewing port formed in said elongated rectangular flexible panel, said first lateral panel, or said second lateral panel.

5. The chamber of claim 4, said viewing port comprising a first flexible layer attached to an inside of said chamber, and a second flexible layer attached to an outside of said chamber, said first and second flexible layers being more rigid than said elongated rectangular flexible panel, said first lateral panel, and said second lateral panel.

6. The chamber of claim 5, further comprising a first flexible laminate ring formed over the second rigid layer.

7. The chamber of claim 6, further comprising a second flexible laminate ring formed over the first laminate ring.

8. The chamber of claim 1, wherein said first longitudinal perimeter end comprises a first edge, and said second longitudinal perimeter end comprises a second edge.

9. The chamber of claim 1, wherein said closure member is located away from said first longitudinal perimeter end and said second longitudinal perimeter end.

10. The chamber of claim 1, wherein said closure member is located between said first longitudinal perimeter end and said second longitudinal perimeter end.

* * * * *